Patented Feb. 13, 1951

2,541,420

UNITED STATES PATENT OFFICE 2,541,420

PURIFICATION OF STREPTOMYCIN BY CARBOXYLIC ACID TYPE ION EXCHANGE RESINS

Eugene E. Howe, Bound Brook, N. J., and Irving Putter, Long Island City, N. Y., assignors of one-half to Merck & Co., Inc., Rahway, N. J., a corporation of New Jersey, and one-half to Rohm & Haas Company, Philadelphia, Pa., a corporation of Delaware No Drawing. Application January 8, 1949, Serial No. 69,986

17 Claims. (Cl. 260—210)

This application is a continuation-in-part of of our co-pending patent application Serial No. 778,464, filed October 7, 1947, now abandoned.

This invention relates to the recovery of antibiotic agents from solutions of those agents produced by the propagation of microorganisms. More particularly, our invention relates to a new and improved method for recovering streptomycin from nutrient media or broths in which the antibiotic has been elaborated by propagation of streptomycin-producing strains of *Streptomyces griseus* therein.

Streptomycin is now produced industrially by propagating streptomycin-producing strains of the fungus *Streptomyces griseus* in liquids which contain nutrients for the growth of this microorganism, this propagation being carried out under aerobic conditions. These liquids, both before propagation, and after propagation is complete, are usually termed nutrient media or broths. The resulting solution which contains in addition to streptomycin, numerous metabolic products of fermentation and residual food substances, must then be freed of the propagating organism and other solid materials, and treated in order to recover the streptomycin therefrom.

In present practice it is usual to adsorb the streptomycin present in the broth on activated carbon, and then remove the adsorbed streptomycin from the activated carbon by elution with a suitable elution liquid. While this procedure is successful in that it permits the recovery of streptomycin from the nutrient medium or broth, from the industrial point of view it is an expensive and objectionable method, since it requires relatively large amounts of the activated carbon which is utilized as the adsorbing agent. Due to the low adsorptive properties of activated carbon for sterptomycin, necessitating the use of relatively large amounts of the adsorbent as compared with the quantity of streptomycin to be recovered from the broth, the use of recovery apparatus, such as filters and evaporators, of relatively large capacity, is also necessary. This adds considerably to the cost of manufacturing this antibiotic.

Moreover, activated carbon is an inherently expensive material. When once utilized, in accordance with the conventional batchwise procedure, in the adsorption of streptomycin from a nutrient medium in which *Streptomyces griseus* has been propagated, it is generally not feasible to re-utilize the activated carbon for successive adsorption operations.

The disadvantages inherent in the present procedure for recovering streptomycin from broths, utilizing activated carbon as the adsorbent, may be summed up by stating that the method is inherently expensive, due to the low adsorptive capacity of the activated carbon. Relatively large volumes of carbon, as well as equipment of relatively high capacity, are necessary for recovering relatively small amounts of streptomycin. Moreover, it is a relatively slow precedure, and results in tying up relatively expensive recovery equipment of considerable capacity for long periods of time. This factor also adds greatly both to the expense and difficulty of treating relatively large volumes of nutrient broths. Further, only about 60-80% of the streptomycin is recoverable by this carbon process. The streptomycin thus obtained is also of poor quality, and it is necessary to employ a number of purification procedures in order to obtain a satisfactory pharmaceutical product.

It has heretofore been proposed to adsorb antibiotic substances on ion-exchange resins, but such proposals have not been altogether satisfactory because the resins that have been used adsorb not only the antibiotic substances but various other complex organic compounds which are invariably found in propagation broths. These proposals also suffer from the difficulty encountered in eluting the adsorbed antibiotic from the resin, an operation which can be accomplished only by contaminating the antibiotic with excessive amounts of acids, or salts, and then often in such poor yields as to be impractical for commercial production.

We have now found, however, that streptomycin may be recovered from fermentation broths with surprising efficiency and facility by means of ion-exchange resins whose polar groups are carboxyl groups. These resins offer substantial advantages over all other adsorbents which have been tried from the standpoint of purity of product, recovery yields, and economics of operation.

Whereas, with other adsorbents such as carbon, fuller's earth, synthetic sulfonic acid resins and zeolites, the adsorption step serves primarly as a concentration step after which numerous intricate purification steps are required, the product obtained directly from the broth by use of the carboxylic acid resins is of such purity as to yield directly a crystalline calcium chloride complex salt from methanol solution. The source of this high degree of purity is twofold. All non-basic materials fail to be adsorbed from the broth because of the ion-exchange nature of the adsorption. Further, the action of the resins have been found to be highly selective, adsorbing only streptomycin to the substantial exclusion of other nitrogenous organic compounds in the broth. Secondly, the antibiotic is eluted from the resin by practically stoichiometric amounts of acid avoiding the necessity of introducing high concentrations of salts and acids common in most other type resin elutions.

By use of the carboxylic acid type exchange resins it is possible to recover streptomycin in quantitative yields from the fermented broth. In fact, the recoveries are so reliable and quantitative that an assay procedure for broths has been developed based on adsorption of streptomycin on resins, elution, and identification of the relatively pure streptomycin eluted by degradation reactions. Furthermore, the recovery of streptomycin by the process herein described is so effective that we routinely pass various process fractions such as crystallization mother liquors, filter cake washes, equipment washes, etc. through a scavenger column to remove the last traces of streptomycin before they are discarded. This scavenger column is then periodically eluted and the streptomycin recovered in the usual manner.

A number of other favorable features of the carboxylic acid ion-exchange resins combine to make a process for recovering streptomycin based on their use of great economic advantage. As an ion-exchange process the recovery of streptomycin resembles a water softening operation; the streptomycin is removed from broth by passage over the resin, the resin is washed (eluted) with dilute acid and regenerated with alkali and is ready for reuse. Thus, no organic solvents are required and the resin adsorbent may be reused indefinitely. Since the ionic reactions involved are very rapid, high flow rates of broth through the adsorbent bed are feasible, for example, 3 to 10 times the flow rates possible with carbon adsorption beds. A further feature of great interest and importance is the high adsorptive capacity achieved as high as 1 gram of streptomycin per gram of resin with the preferred type resins. This allows for greater economy of equipment and installation since the streptomycin from large amounts of broth may be adsorbed on small beds of adsorbate and eluted with small volumes of acid minimizing the problems of further processing.

Ion-exchange resins having carboxylic polar groups have heretofore been described in the literature. In general, they are formed either by condensing a phenol and an aldehyde, one of which contains a carboxyl group, particularly resorcylic acid and formaldehyde, or by the copolymerization of a polymerizable acid with a divinyl compound i. e., a compound having two $CH_2=CH-$ groups, such, for example, as acrylic or methacrylic acid and divinyl benzene. Resins of this type are described in U. S. Patents Nos. 2,319,359; 2,333,754; 2,340,110; 2,340,111 and others and are characterized by the common quality of having their ion-exchange ability dependent upon carboxyl groups in the resin molecule. In the practice of the present invention we prefer to use a copolymer of acrylic or methacrylic acid and divinyl benzene as such resins possess a greater number of carboxyl groups per unit of weight and as a result thereof a higher capacity for adsorbing ions. We have found, however, that the capacity of ion-exchange resins to adsorb streptomycin is not dependent alone upon the number of polar groups in a given weight or volume of resin. It is also dependent upon the porosity of the resin for in a dense resin only the polar groups on the outer surface of the resin particle are able to react with the antibiotic whereas in the case of a resin of porous structure the streptomycin molecules will at least partially penetrate the pores of the resin and react with polar groups in the interior of the resin particle.

In the case of phenol-formaldehyde condensates a porous resin structure is obtained by having the condensation reaction pass through an aqueous gel stage in the manner well known to the art. In copolymers of polymerizable acids and divinyl compounds the porosity is to a large extent dependent upon the degree of cross-linking imparted by the divinyl component. In these copolymers the divinyl component contributes water-insolubility and a certain degree of hardness to the resin but at the same time detracts from the porosity of the resin. It is, therefore, desirable in practicing the present invention with this type of ion-exchange resin to use a resin containing the least amount of divinyl compound that will produce the physical properties required of an ion-exchange material.

The ion-exchange resins we have found to be most efficient in the practice of our process are copolymers of acrylic or methacrylic acid and divinyl benzene wherein the divinyl benzene component constitutes from 2½ to 5 per cent of the resin composition. Such resins have an extremely high capacity for streptomycin and in some instances will adsorb their own weight of streptomycin from broth. Their capacity is in excess of thirty times the capacity of an equal weight of the carbon adsorbents and from ten to thirty times the adsorptive capacity of sulfonic acid type exchange resins. Larger amounts of divinyl benzene may be used in making the resin but with sacrifice of capacity, and no advantage is to be gained by going beyond a 10% divinyl benzene content.

For the adsorption of streptomycin we prefer to have the resin in the form of its sodium salt for the sodium salt is economical to use, is readily replaced by streptomycin, and is non-toxic. Other monovalent metals are the substantial equivalent of sodium in operation but are not so economical to use. The ammonium salt form of the resin is our second choice. The resin in the form of its salt with divalent metals may also be used, although these metals are not so readily replaced by streptomycin as are the monovalent ions. The calcium salt form of the resin is particularly low in capacity for streptomycin and should be avoided unless a sequestering agent is added to the broth to aid in the replacement. The magnesium and copper salt forms have capacities slightly lower than the monovalent metal salt form. The resins may also be used in the hydrogen form or in a mixed form in which some of the carboxyl groups are in a salt form and some are in the hydrogen form.

The pH of the broth in contact with the resin should be above 4.5 and preferably at about the neutral point. When the resin is used in the form of a salt of a strong base, a rise in pH takes place within the column, particularly if an acidic broth is used. Therefore, even if the broth has a pH below 4.5, its pH will rapidly be brought to the operative range through a neutralization of the excess acidity by the exchange resin. However, to the extent that resin is used to neutralize acidity, it is not available for streptomycin adsorption and, therefore, it is preferable to neutralize any excess acidity by other means. The carboxylic resins will adsorb streptomycin from broths that are quite alkaline, and it seems that the upper operable pH limit is determined only by the stability of the streptomycin. While it is not likely that a broth of pH as high as 11.5 will be encountered in practice, the streptomycin may be separated even from a broth of this high pH. In such a case it would be preferable to use the resin in the hydrogen form.

It has also been observed that, while the presence of sodium ions in the fermentation broths does not materially affect the capacity of the carboxylic exchangers for streptomycin, the presence of some other ions, notably calcium ions, has a marked effect. It is in those cases where a choice of fermentation conditions might lead to a high concentration of interfering cations, therefore, desirable to remove the intefering effect of such ions by dilution, by complexing with a sequestering agent, or by removing the ions themselves by precipitation or by replacing them with sodium ions.

The fermentation broth containing the streptomycin, after such steps as filtering and adjusting the pH as may be necessary or desirable, is brought into contact with the carboxylic type ion-exchange resin. This is preferably accomplished by passing the broth through one or more columns of the resin. When a single column of resin is used, the adsorption step may be discontinued when streptomycin appears in the liquid leaving the column. At this point the capacity of the column for adsorbing streptomycin is not fully utilized. By continuing the adsorption step beyond this point leakage of streptomycin occurs but larger amounts are adsorbed by the resin. The broth leaving the partially exhausted column may be passed through a second column of fresh resin and the first column continued in operation until no more streptomycin is adsorbed. By operating two or more columns in this fashion and alternating the flow through the columns so that the leakage from a partially exhausted column passes through a bed of fresh resin, the full capacity of the resin for streptomycin may be utilized without waste through leakage.

After water is passed through the exhausted column to remove residual broth, the adsorbed streptomycin is recovered by passing through the column an aqueous solution of an electrolyte. Our preference is an aqueous solution of an acid, particularly a strong, inorganic acid such as hydrochloric acid. In place of an aqueous solution of an acid a methanol solution may be used or a solution containing both water and methanol. The carboxylic type ion-exchange resins have such a strong affinity for hydrogen that the streptomycin can be readily removed from the resin by means of only a slight excess of strong acid. The acid will also remove from the resin whatever metal ions were not replaced by streptomycin during the adsorption step and, therefore, on elution there is obtained a slightly acidic aqueous solution of streptomycin that also contains some metal salts. When the adsorption step is run as described above so as to utilize most of the exchange capacity of the resin the amount of metal salts is so small as to present no process difficulties. The streptomycin may be recovered from this solution by neutralizing, then concentrating by evaporating preferably under reduced pressure to a small volume or to dryness, taking up the residue in methanol or other solvent that will dissolve the streptomycin but no appreciable amount of the salts present, filtering off the salts, precipitating the streptomycin from its methanol solution by the addition of acetone or other suitable precipitant and finally filtering and drying. The precipitated streptomycin thus obtained is readily converted to the crystalline calcium chloride complex salt by dissolving said product in methanol and adding the required amount of calcium chloride as described in the art.

When acid is used for eluting, the resin is left in the hydrogen form and, to convert it to the sodium form, an aqueous solution of sodium hydroxide is passed through the column or allowed to remain stationary in the column. After being washed to remove the regenerating solution, the column is ready for reuse in adsorption of streptomycin.

Our preferred practice is, as above-described, a three-step cycle of adsorption, elution, and regeneration performed in columns of resin through which the fermentation broth, eluting solution, and regenerating solution pass in sequence. Column operation is not, however, essential to the process and the same three steps may be performed in any type of apparatus wherein the solutions and resin may be brought in contact. It is also apparent that, when the resin is used in its hydrogen form for adsorbing streptomycin, the acid elution step serves also to regenerate the resin. It should also be mentioned that calcium chloride solution is quite efficient an eluting material and permits the ready recovery of relatively pure streptomycin directly from the eluate by conventional crystallization steps. In this case the resin is in the calcium form after elution and regeneration to the sodium form may be accomplished by passing a solution of sodium chloride through the column.

The following examples are given to illustrate the invention:

EXAMPLE 1

A granular copolymer of methacrylic acid and divinyl benzene containing 5% divinyl benzene was slurried with water and then positioned in a suitable adsorption column. This provided a bed of adsorbent resin of approximately three inches in depth.

The resin was washed with 2.5 N hydrochloric acid and then with water. It was then converted to the ammonium cycle by the addition of a solution of 2.5 N ammonium hydroxide, followed by washing again with water. Swelling occurred when the resin was converted to the ammonium cycle, giving a column with a resulting bed height of approximately 5 inches. The column was then backwashed with water until the pH of the effluent liquid was about 10.5. The column was then ready for use in the adsorption of streptomycin from aqueous solution of the antibiotic agent.

The filtered broth resulting from the propagation of *Streptomyces griseus* in a liquid medium containing nutrients for the microorganism was given a preliminary clarifying treatment and it was then fed to the adsorption column under gravity flow. A head of liquid of approximately 3 feet was provided on the column, and the rate of flow was adjusted to provide for a contact period of one minute between the resin and the broth.

At the end of the adsorption cycle the column was given a displacement wash with water, and the liquid level dropped to the top of the resin bed. The eluting solution, hydrochloric acid of from 1.0 to 1.5 N concentration, was then applied to the top of the column and the effluent collected as it came off the column. As the later eluate fractions were highly acidic (below pH 1.0), they were neutralized immediately by the addition of 2.5 N sodium hydroxide solution.

The neutralized eluate was concentrated under reduced pressure to a small volume, diluted by the addition of methanol, filtered, and the methanol solution precipitated. The solid product was removed by filtration, and then dried under reduced atmospheric pressure at room temperature. It was streptomycin of satisfactory therapeutic quality.

After completion of the elution, the column was washed with an additional quantity of 2.5 N hydrochloric acid, followed by washing with water. The column was then regenerated with ammonium hydroxide solution by treatment as described above, and was ready for reuse.

Based on the quantity of streptomycin adsorbed by the resin, the yield of streptomycin after elution was 96%. The potency of the product was 500 units per milligram, and the effluent broth loss was only 1.6%.

EXAMPLE 2

Two columns containing 50 g. of the resin used in Example 1 were converted to the sodium cycle by passing through each column 1000 cc. of 10% aqueous sodium hydroxide. The columns were washed with 2000 cc. of water each. The columns were connected with rubber tubing to operate in series flow.

Sixty-four and eight-tenths liters of streptomycin broth was acidified to pH 2 with phosphoric acid, filtered, neutralized to pH 7 with aqueous sodium hydroxide and re-filtered. The treated broth assayed 360 u./cc.

The treated broth was then allowed to flow under about 1 lb. pressure through the two resin columns in series at a rate of 150 cc./min. The spent broth at the end of the run assayed 4.3 u./cc. or 1.2%. The columns were washed with 1000 cc. of water and then eluted by passing through each column 1000 cc. of 1.0 N aqueous hydrochloric acid. The rich eluate from the first column amounted to 670 cc. and assayed 25,000 u./cc. The rich eluate from the second column amounted to 235 cc. and assayed 28,000 u./cc. The recovery of streptomycin calculated 100.5%.

The eluate from the first column was concentrated in vacuo at 30° C. almost to dryness, treated with 100 cc. methanol, and filtered. The solid removed by filtration weighed 2.75 g. The methanol solution was precipitated in 500 cc. of acetone; the solid filtered, washed with 50 cc. acetone, and dried in vacuo. Weight: 26.3 g., assay: 650 u./mg., ash (sulfated): 15%. The recovery at this point calculated 101.5%.

The acetone precipitated solid was dissolved in 81 cc. of methanol and to the solution was added 23.6 g. of calcium chloride anhydrous. The solution was stirred for 40 hours and then filtered. The precipitate was washed with a 10% solution of calcium chloride in methanol, then with ethanol, and dried. The product weighed 17.5 g. and assayed 780 u./mg. (theoretical for pure streptomycin calcium chloride complex=779 u./mg.). The overall recovery from broth (through the first column) was 80%.

EXAMPLE 3

A column containing 2 g. of a resorcyclic acid-formaldehyde condensate known as Wofatite C was converted to the sodium cycle by passing through 100 cc. of 10% sodium hydroxide. The column was washed with 200 cc. of water.

One liter of streptomycin broth was acidified to pH 2 with phosphoric acid, filtered, neutralized with sodium hydroxide and refiltered. The treated broth assayed 537 u./cc.

The treated broth was passed through the resin column at a rate of 0.64 cc./min. The spent broth which assayed 198 u./cc. would normally be re-cycled to a second column but this was not done in this case. The column was then washed with 100 cc. of water and eluted with 200 cc. of 1.0 N aqueous hydrochloric acid. The rich eluate amounted to 172 cc. and assayed 1,750 u./cc. This corresponds to an 88% recovery of the streptomycin adsorbed by passage through one resin column.

The eluate was concentrated in vacuo at 25° C. almost to dryness and the concentrate diluted with 5 cc. of methanol. The solution was filtered and added to 25 cc. of acetone. The precipitate was filtered and dried in vacuo. Weight: 580 mg., potency: 500 u./mg. This amounts to an 86.5% recovery from the units adsorbed by the resin.

EXAMPLE 4

The following table illustrates the comparative performances of various commonly used adsorbents and carboxylic type resins for the adsorption and recovery of streptomycin from an aqueous solution thereof. These experimental results were obtained by passing a relatively pure aqueous solution containing about 0.1% of streptomycin through columns containing the adsorbents. It was found that the different adsorbents required diverse eluting agents for optimum results. For example, the silicate exchange resin is destroyed by acid, hence this medium cannot be employed as an eluting agent. In each case the use of the eluant giving optimum results is indicated:

*Comparison of various ion exchange resins and adsorbents in the recovery of streptomycin*

| Type of Adsorbent | Capacity mg./g. Adsorbent | Eluting Agent Used | Per Cent Recovery on Elution | Potency of Product Obtained |
|---|---|---|---|---|
| A sulfonated phenol-formaldehyde resin | 10 | Aq. NaCl / Aq. H₂SO₄ | 30–50 / 40 | ca 100 u./mg. |
| Silicate exchange resin | 40 | Aq. NaCl | 100 | ca 50 u./mg. |
| A sulfonated coal resin | 12 | Aq. NaCl / Aq. H₂SO₄ | 40–60 / 40 | ca 100 u./mg. |
| Carbon | 20 | Acidic methanol-water. | 60–75 | 200–350 u./mg. |
| Fuller's earth | 50 | Aq. pyridine hydrochloride. | 30–40 | 75 u./mg. |
| Copolymer of methacrylic acid and divinyl benzene containing 5% divinyl benzene. | 600–1500 | Aq. HCL | 100 | 600 u./mg. |
| Copolymer of methacrylic acid and divinyl benzene containing 10% divinyl benzene. | 300–800 | ____do____ | 100 | 600 u./mg. |
| A carboxylic resin believed to be of the phenol-formaldehyde type known as Permutit XHIO. | 500–900 | ____do____ | 100 | 650 u./mg. |

We claim:

1. The process of recovering streptomycin from aqueous solutions thereof, which comprises contacting an aqueous solution of streptomycin with an ion-exchange resin deriving its exchange capacity essentially from carboxylic groups, whereby said streptomycin is adsorbed on said resin, and then eluting said resin to remove the adsorbed streptomycin.

2. The process of recovering streptomycin from culture media wherein streptomycin has been elaborated by propagation of streptomycin-producing strains of *Streptomyces griseus* therein, which comprises contacting a culture medium in which *Streptomyces griseus* has been propagated with an ion-exchange resin which derives its exchange capacity essentially from carboxylic groups, whereby said streptomycin is adsorbed on said resin, and then eluting said resin to remove the adsorbed streptomycin.

3. The process of recovering streptomycin from aqueous solutions thereof, which comprises contacting an aqueous solution of streptomycin with an ion-exhance resin deriving its exchange capacity essentially from carboxylic groups, whereby said streptomycin is adsorbed on said resin, and then eluting said resin with an acidic solution to remove the adsorbed streptomycin.

4. The process of recovering streptomycin from aqueous solutions thereof, which comprises contacting an aqueous solution of streptomycin with an ion-exchange resin deriving its exchange capacity essentially from carboxylic groups, whereby said streptomycin is adsorbed on said resin, and then eluting said resin with an aqueous solution of calcium chloride to remove the adsorbed streptomycin.

5. The process of recovering streptomycin from aqueous solutions thereof, which comprises contacting an aqueous solution of streptomycin with an ion-exchange resin formed by the copolymerization of a divinyl compound and a polymerizable carboxylic acid whereby said streptomycin is adsorbed on said resin, and then eluting said resin to remove the adsorbed streptomycin.

6. The process of recovering streptomycin from aqueous solutions thereof, which comprises contacting an aqueous solution of streptomycin with an ion-exchange resin formed by the copolymerization of divinyl benzene and an acid selected from the group consisting of acrylic and methacrylic acids whereby said streptomycin is adsorbed on said resin, and then eluting said resin to remove the adsorbed streptomycin.

7. In the process of recovering streptomycin from culture media in which it has been elaborated, the improvement which comprises adsorbing the streptomycin on an ion-exchange resin which derives its exchange capacity essentially from carboxylic groups and then eluting the adsorbed streptomycin from said resin.

8. In the process of recovering streptomycin from culture media in which it has been elaborated, the improvement which comprises adsorbing the streptomycin on an ion-exchange resin formed by the copolymerization of from 2½ to 5 parts of divinyl benzene and from 95 to 97½ parts of an acid selected from the group consisting of acrylic and methacrylic acids and then eluting the adsorbed streptomycin from said resin.

9. In the process of recovering streptomycin from culture media in which it has been elaborated, the improvement which comprises passing the clarified broth through a column of ion-exchange resin the polar groups of which are carboxyl groups in salt form, and eluting the adsorbed streptomycin from the resin by passing a solution of acid through the column.

10. In the process of recovering streptomycin from culture media in which it has been elaborated, the improvement which comprises passing the clarified broth through a column of ion-exchange resin formed by the copolymerization of divinyl benzene and an acid selected from the group consisting of acrylic and methacrylic acids, said resin being in the form of its sodium salt, and then eluting the adsorbed streptomycin from the resin by passing a solution of acid through the column.

11. A process of recovering streptomycin from culture media in which it has been elaborated, wherein a column of ion-exchange resin deriving its exchange capacity essentially from carboxylic groups is operated in a three-step cycle consisting of passing a clarified broth from said culture media through the column whereby streptomycin is adsorbed by the resin, passing a solution of acid through said resin whereby the adsorbed streptomycin is eluted from the resin, and passing a solution of base through said column whereby the resin is regenerated to the form used in the adsorption step.

12. A process as defined in claim 11 wherein the solution of base used to regenerate the resin is a solution of sodium hydroxide.

13. A process for recovering streptomycin from culture media in which it has been elaborated, wherein a column of ion-exchange resin, formed by the copolymerization of divinyl benzene and an acid selected from the group consisting of acrylic and methacrylic acids, is operated in a three-step cycle consisting of passing a clarified broth from said culture media through the column whereby streptomycin is adsorbed by the resin, passing a solution of acid through said resin whereby the adsorbed streptomycin is eluted from the resin, and passing a solution of base through said column whereby the resin is regenerated to the form used in the adsorption step.

14. A process as defined in claim 13 wherein the divinyl benzene component of said resin is from 2½% to 5% of the whole.

15. The process of recovering streptomycin from aqueous solutions thereof, which comprises contacting an aqueous solution of streptomycin with an ion-exchange resin formed by condensing a phenol and an aldehyde, one of which contains a carboxylic group, whereby said streptomycin is adsorbed on said resin, and then eluting said resin to remove the adsorbed streptomycin.

16. The process of recovering streptomycin from aqueous solutions thereof, which comprises contacting an aqueous solution of streptomycin with an ion-exchange resin formed by condensing resorcylic acid and formaldehyde, whereby said streptomycin is adsorbed on said resin, and then eluting said resin to remove the adsorbed streptomycin.

17. The process of recovering streptomycin from aqueous solutions thereof, which comprises contacting an aqueous solution of streptomycin with an ion-exchange resin of the condensed phenol-formaldehyde type containing carboxylic groups, whereby said streptomycin is adsorbed on said resin, and then eluting said resin to remove the adsorbed streptomycin.

EUGENE E. HOWE.
IRVING PUTTER.

(References on following page)

REFERENCES CITED

The following references are of record in the file of this patent:

UNITED STATES PATENTS

| Number | Name | Date |
|---|---|---|
| 2,443,485 | Waksman et al. | June 15, 1948 |
| 2,528,022 | Van Dolah et al. | Oct. 31, 1950 |

OTHER REFERENCES

Le Page et al., J. Biol. Chem. v. 162 (1946), p. 165.

Kocholaty et al., J. Biol. Chem. v. 168 (1947), p. 763.